(12) United States Patent
Hashimoto et al.

(10) Patent No.: US 10,622,861 B2
(45) Date of Patent: Apr. 14, 2020

(54) STATOR AND BUS BAR CONNECTOR CONFIGURATION

(71) Applicant: AISIN AW CO., LTD., Anjo-shi, Aichi-ken (JP)

(72) Inventors: Shingo Hashimoto, Okazaki (JP); Shingo Sato, Okazaki (JP); Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 246 days.

(21) Appl. No.: 15/553,494

(22) PCT Filed: Feb. 19, 2016

(86) PCT No.: PCT/JP2016/054801
§ 371 (c)(1),
(2) Date: Aug. 24, 2017

(87) PCT Pub. No.: WO2016/158062
PCT Pub. Date: Oct. 6, 2016

(65) Prior Publication Data
US 2018/0034339 A1 Feb. 1, 2018

(30) Foreign Application Priority Data
Mar. 31, 2015 (JP) .................................. 2015-072095

(51) Int. Cl.
*H02K 3/52* (2006.01)
*H02K 3/12* (2006.01)
(Continued)

(52) U.S. Cl.
CPC .................. *H02K 3/50* (2013.01); *H02K 1/16* (2013.01); *H02K 3/12* (2013.01); *H02K 3/18* (2013.01);
(Continued)

(58) Field of Classification Search
CPC ............ H02K 1/16; H02K 1/165; H02K 3/04; H02K 3/12; H02K 3/14; H02K 3/28;
(Continued)

(56) References Cited

U.S. PATENT DOCUMENTS

2007/0007832 A1* 1/2007 Ichikawa ........... H02K 15/0056
310/71
2009/0102312 A1* 4/2009 Tsukashima ........... H02K 3/522
310/215
(Continued)

FOREIGN PATENT DOCUMENTS

JP 2007-312560 A 11/2007
JP 2012-90375 A 5/2012
(Continued)

OTHER PUBLICATIONS

May 24, 2016 Search Report issued in International Patent Application No. PCT/JP2016/054801.

*Primary Examiner* — Nguyen Tran
*Assistant Examiner* — David A. Singh
(74) *Attorney, Agent, or Firm* — Oliff PLC

(57) ABSTRACT

A stator that includes a stator core including a plurality of teeth with a slot in between; a plurality of coils each formed of a conductor, each of the coils including: an accommodated portion accommodated in the corresponding slot, a coil end disposed on an outer side of an end face of the stator core, and a lead wire protruding from the accommodated portion and extending radially outward of the stator core; and a connector connected to ends of the lead wires of the coils.

11 Claims, 7 Drawing Sheets

(51) Int. Cl.
*H02K 3/28* (2006.01)
*H02K 3/50* (2006.01)
*H02K 3/18* (2006.01)
*H02K 1/16* (2006.01)
*H02K 3/34* (2006.01)
*H02K 5/24* (2006.01)
*H02K 1/27* (2006.01)
*H02K 5/16* (2006.01)

(52) U.S. Cl.
CPC ............... *H02K 3/28* (2013.01); *H02K 3/345* (2013.01); *H02K 5/24* (2013.01); *H02K 1/2706* (2013.01); *H02K 3/52* (2013.01); *H02K 3/522* (2013.01); *H02K 5/161* (2013.01)

(58) Field of Classification Search
CPC ............ H02K 3/34; H02K 3/345; H02K 3/50; H02K 3/52; H02K 3/522; H02K 5/24; H02K 15/0025; H02K 15/0037; H02K 15/0043; H02K 15/0068; H02K 2203/06
USPC ...................................... 310/71, 260
See application file for complete search history.

(56) References Cited

U.S. PATENT DOCUMENTS

| | | | |
|---|---|---|---|
| 2009/0127948 A1* | 5/2009 | Shimizu | H02K 3/50 310/71 |
| 2009/0200879 A1 | 8/2009 | Ghodsi-Khameneh et al. | |
| 2009/0309452 A1* | 12/2009 | Tao | H02K 3/28 310/198 |
| 2010/0207466 A1* | 8/2010 | Endo | H02K 3/522 310/71 |
| 2010/0231082 A1* | 9/2010 | Bodin | H02K 3/12 310/195 |
| 2012/0217836 A1* | 8/2012 | Watanabe | H02K 3/12 310/207 |
| 2014/0015498 A1* | 1/2014 | Kimiabeigi | H02P 9/02 322/90 |
| 2014/0021823 A1* | 1/2014 | Kitamura | H02K 3/14 310/208 |
| 2014/0319942 A1* | 10/2014 | Nakayama | H02K 15/0435 310/71 |
| 2015/0017845 A1* | 1/2015 | Tomita | H01R 4/186 439/879 |
| 2015/0054374 A1* | 2/2015 | Neet | H02K 3/12 310/198 |
| 2015/0061434 A1* | 3/2015 | Asano | H02K 3/12 310/71 |
| 2015/0076945 A1* | 3/2015 | Kudou | H02K 3/28 310/71 |
| 2016/0006314 A1* | 1/2016 | Kaneshige | H02K 3/12 310/71 |

FOREIGN PATENT DOCUMENTS

| | | |
|---|---|---|
| JP | 2012-249344 A | 12/2012 |
| JP | 2013-179832 A | 9/2013 |
| JP | 2014-90567 A | 5/2014 |

* cited by examiner

STATOR AND BUS BAR CONNECTOR CONFIGURATION

The present disclosure relates to a stator for use in a rotating electrical machine.

A stator which has been conventionally known has a structure in which lead wires of coils mounted to a stator core are joined together at an axial end of a stator. Such a stator is disclosed in, for example, JP 2012-249344 A.

JP 2012-249344 A discloses a configuration in which some of lead wires of coils are welded and joined together by bus bars (connection members) at an axial end of a stator. Bus bars connect lead wires of different coils to one another in order to form a neutral point on a Y connection in a three-phase motor or in order to connect in-phase coils to one another. In JP 2012-249344 A, each of the lead wires has an end extending radially outward of the stator core. The bus bars extend circumferentially at an outer periphery of the stator core. In JP 2012-249344 A, an increase in axial size of the stator is suppressed in such a manner that the bus bars are disposed between the ends of the lead wires and an end face of the stator core in the axial direction of the stator core. The bus bars are joined together in a state in which the ends of the lead wires and ends of the bus bars are adjacent to (overlap) each other in the axial direction.

SUMMARY

In JP 2012-249344 A, two lead wires are connected to each other via a bus bar (connection member). In a three-phase motor, for example, coils of each phase are connected in parallel in multiple rows. In cases of such a structure, as the number of coils connected in parallel increases, the number of bus bars for connecting the coils to power lines or neutral points also increases. According to JP 2012-249344 A, in this case, the bus bars cannot be disposed on a region between the ends of the lead wires and the end face of the stator core. As a result, an extra space is required for disposing the bus bars, in addition to the region described above. In JP 2012-249344 A, accordingly, when the number of connection points via connection members (bus bars) increases, a stator is upsized because of an extra space required for disposing the connection members.

Also in JP 2012-249344 A, when the number of connection points via the bus bars increases, the number of parts also increases. The increase in number of parts complicates work for assembling and work for welding, and causes a rise in part cost.

An exemplary aspect of the present disclosure provides a stator that is not upsized and is manufactured with smaller number of parts even when the number of connection points via connection members increases.

An exemplary aspect of the present disclosure provides a stator including: a stator core including a plurality of teeth with a slot in between; a plurality of coils each formed of a conductor, each of the coils including an accommodated portion accommodated in the corresponding slot, a coil end disposed on an outer side of an end face of the stator core, and a lead wire protruding from the accommodated portion and extending radially outward of the stator core; and a connector connected to ends of the lead wires of the coils. The connector is disposed between the coil ends and an outer peripheral face of the stator core in a radial direction of the stator core and between an axial end face of the stator core and the ends of the lead wires in an axial direction of the stator core. The connector is connected to at least three of the lead wires in a state in which the connector is adjacent to the ends of the lead wires in a circumferential direction of the stator core.

In the stator according to the first aspect of this disclosure, as described above, the connector is connected to at least three of the lead wires in the state in which the connector is adjacent to the ends of the lead wires in the circumferential direction of the stator core. It is thus possible to connect multiple (at least three) lead wires to one another via one connector unlike the cases of connecting two lead wires to each other via one connector. It is therefore possible to establish a connection among lead wires without increasing the number of connectors even when the number of connection points via connnectors increases in, for example, a structure in which coils of each phase are connected in parallel. Since the connector is connected to the read wires in the state in which the connector is adjacent to the ends of the lead wires in the circumferential direction of the stator core, it is also possible to suppress an increase in size (thickness) of the joint between the ends of the lead wires and the connector in the axial direction of the stator core and to enlarge an axial space between the axial end face of the stator core and the ends of the lead wires. It is therefore possible to easily dispose the connector on a region between the coil ends and the outer peripheral face of the stator core in the radial direction of the stator core and between the axial end face of the stator core and the ends of the lead wires in the axial direction of the stator core. As a result, it is possible to suppress protrusion of the connector axially outward of the stator and to suppress protrusion of the connector radially outward of the stator, which makes it possible to suppress an increase in size of the stator. According to the present disclosure, hence, it is possible to suppress an increase in size of a stator and to suppress an increase in number of parts even when the number of connection points via connectors increases.

A second aspect of this disclosure provides a stator including: a stator core including a plurality of teeth with a slot in between; a plurality of coils each including an accommodated portion accommodated in the corresponding slot, a coil end disposed on an outer side of an end face of the stator core, and a lead wire protruding from the accommodated portion and extending radially outward of the stator core; and a connector connected to ends of the lead wires of the coils. The connector is disposed between an axial end face of the stator core and the ends of the lead wires in an axial direction of the stator core. The connector extends along a circumferential direction of the stator core. The connector is connected to the lead wires in at least three places.

In the stator according to the second aspect of this disclosure, as described above, the connector is disposed between the axial end face of the stator core and the ends of the lead wires in the axial direction of the stator core, is formed to extend along the circumferential direction of the stator core, and is connected to the lead wires in at least three places. It is thus possible to connect multiple (at least three) lead wires to one another via one connector. It is therefore possible to establish a connection among the lead wires without increasing the number of connectors even when the number of connection points via connectors increases in, for example, a parallel connection structure. As a result, even when the number of connection points via connectors increases, it is possible to dispose the connector between the axial end face of the stator core and the ends of the lead wires in the axial direction of the stator core such that the connector extends along the circumferential direction of the stator core, which makes it possible to suppress an increase in size of the stator. According to the present disclosure, hence, it is possible to suppress an increase in size of a stator and to suppress an increase in number of parts even when the number of connection points via connectors increases.

According to the present disclosure, as described above, it is possible to suppress an increase in size of a stator and to suppress an increase in number of parts even when the number of connection points via connectors increases.

DETAILED DESCRIPTION OF EMBODIMENTS

Embodiments of the present disclosure will be described below with reference to the drawings.

First Exemplary Embodiment

With reference to FIGS. 1 to 13, a description will be given of a structure of a rotating electrical machine 100 that includes a stator 1 according to a first exemplary embodiment.

(Overall Configuration of Rotating Electrical Machine)

Figure 1:
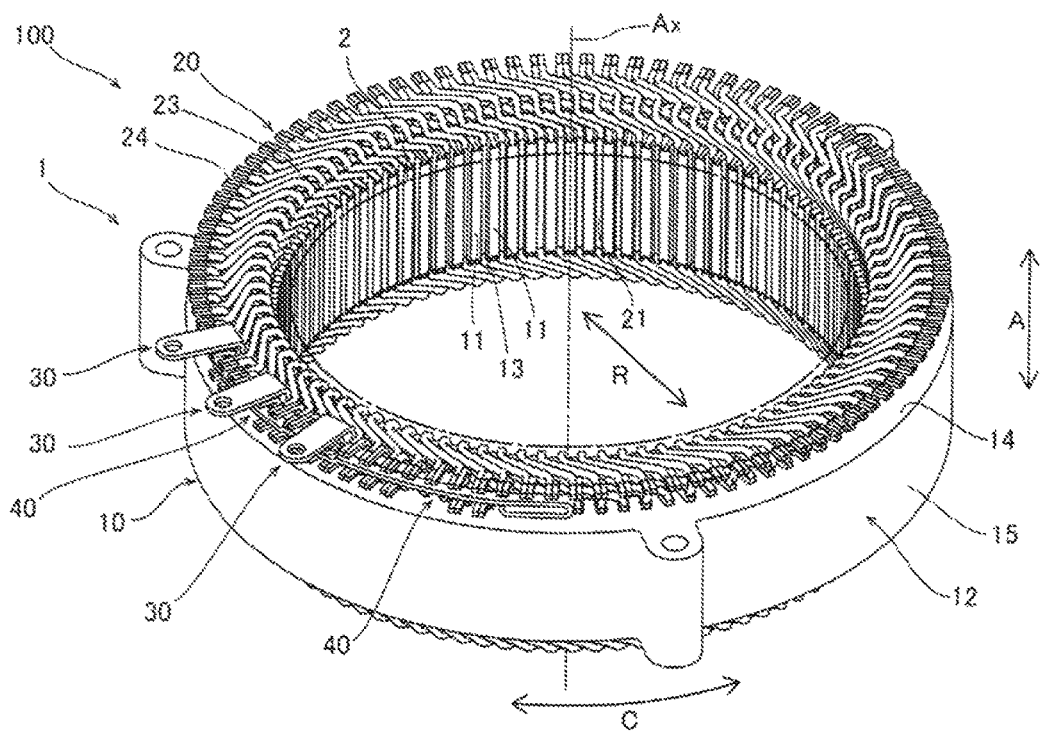
FIG. 1 is a perspective view of a rotating electrical machine according to a first exemplary embodiment.
Figure 2:
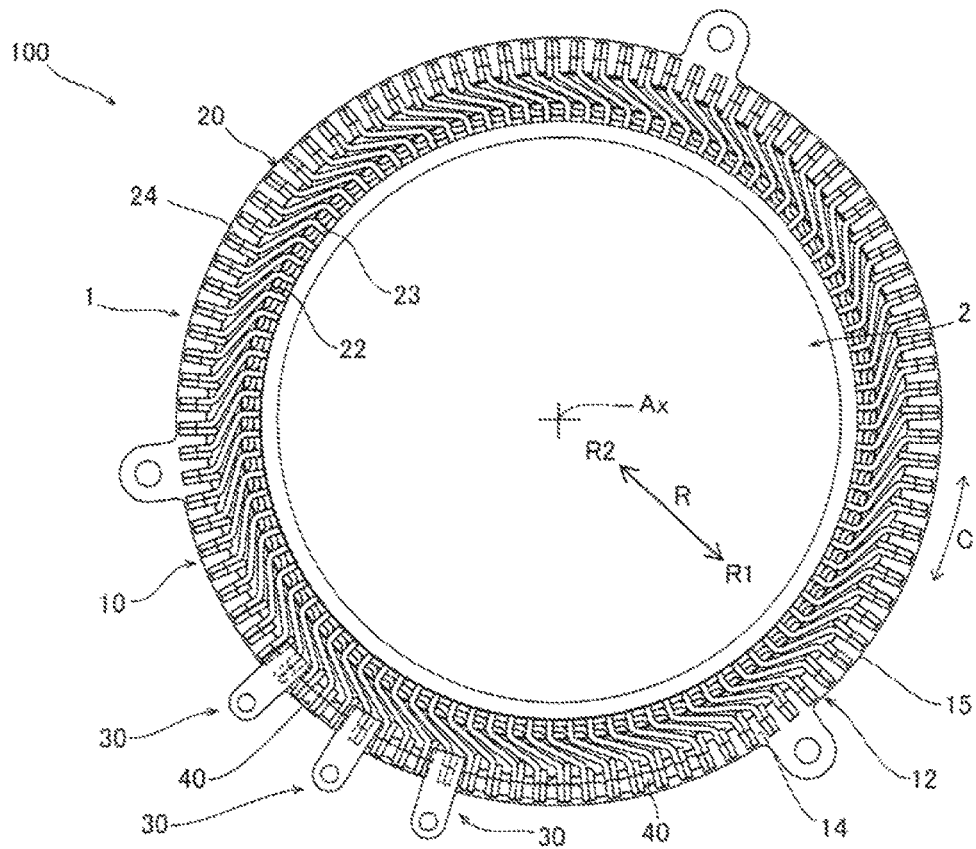
FIG. 2 is a plan view of the rotating electrical machine according to the first exemplary embodiment.

As illustrated in FIGS. 1 and 2, the rotating electrical machine 100 includes the stator 1 and a rotor 2 (see FIG. 2) disposed on an inner peripheral side of the stator 1. The stator 1 includes a stator core 10 having an annular ring shape, coils 20 arranged along an inner periphery of the stator core 10 to form an annular ring shape, power line connection terminals 30 (see FIG. 3), and neutral line connection terminals 40 (see FIG. 3). The rotor 2 has a circular outer peripheral face and includes a permanent magnet (not illustrated). It should be noted that each of the power line connection terminals 30 is an example of a "connection member" (i.e., connector) and a "power line connection member" (i.e., power line connector) in the present disclosure. Moreover, each of the neutral line connection terminals 40 is an example of a "connection member" (i.e., connector) and a "neutral line connection member" (i.e., neutral line connector) in the present disclosure.

The stator 1 and the rotor 2 are accommodated in a casing (not illustrated). In the casing, the stator 1 is fixedly placed, whereas the rotor 2 is rotatably held via bearings. The rotating electrical machine 100 is mounted on, for example, a vehicle such as an automobile.

The stator core 10 having an annular ring shape is formed of, for example, electromagnetic steel plates stacked on top of each other. The stator core 10 includes teeth 11 with a slot 13 in between, and a back yoke 12. The stator core 10 also has axial end faces 14 and a radial outer peripheral face 15.

The teeth 11 extend radially inward (i.e., toward a central axis Ax) frons the back yoke 12. The teeth 11 are spaced uniformly along the circumferential direction of the stator core 10. Each of the slots 13 is formed between adjacent two teeth 11 to hold the corresponding coil 20. The slots 13 are arranged circumferentially on the inner periphery of the stator core 10 so as to extend in the radial direction of the stator core 10. The back yoke 12 corresponds to a portion between radially outer ends of the slots 13 (root-side ends of teeth 11) and the outer peripheral face 15 of the stator core 10. The back yoke 12 has a circumferential shape. The axial end faces 14 each have a flat shape and include end faces of the teeth 11 and end faces of the back yoke 12.

Figure 3:
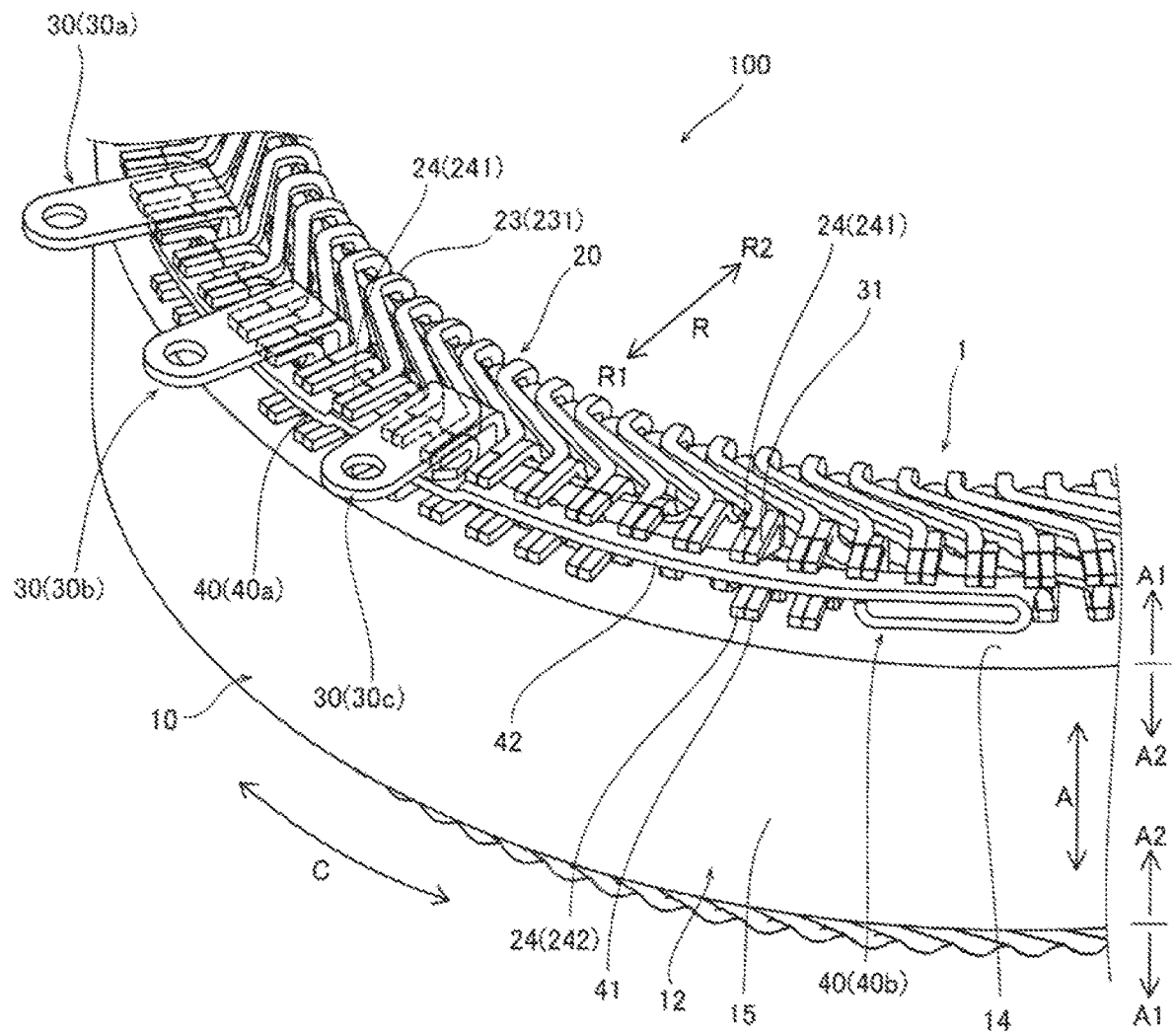
FIG. 3 is an enlarged perspective view of a position, and its vicinity, where power line connection terminals and neutral line connection terminals are disposed, in a stator.

In the following, the axial direction of the stator core 10 (i.e., the direction in which the central axis Ax extends) is referred to as direction A. In FIG. 3, directions A1 of moving away from the axial end faces 14 of the stator core 10 are defined as axially outer sides or upper sides. Directions A2 of approaching the axial end faces 14 are defined as axially inner sides or lower sides. The radial direction of the stator core 10 is referred to as direction R. Direction R1 is defined as a radially outer side, whereas direction R2 is defined as a radially inner side. The circumferential direction of the stator core 10 is referred to as direction C.

Figure 4:
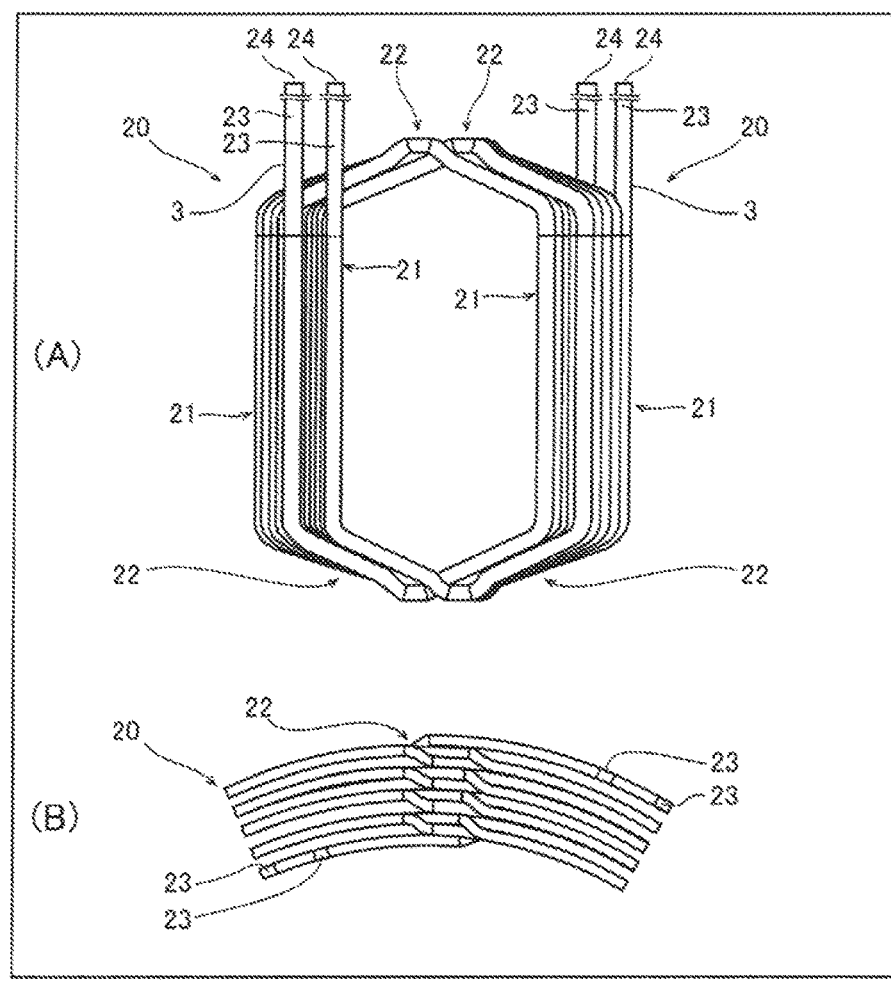
FIG. 4(A) is a front view of coils to be mounted to the stator and FIG. 4(B) is a plan view of the coil.

As illustrated in FIG. 4, each of the coils 20 is formed of a rectangular conductor 3 having a rectangular shape in its cross-section. Each of the coils 20 is formed in an annular shape (concentric winding shape) in such a manner that the rectangular conductor 3 is wound multiple times (e.g., five times) to form a predetermined shape. Each of the rectangular conductors 3 is made of a metal with high conductivity, such as copper, and a surface thereof is subjected to insulation treatment.

Each of the coils 20 has a pair of accommodated portions 21 to be accommodated in the corresponding slots 13, a pair of coil ends 22 disposed outside the axial end faces 14 of the stator core 10, and lead wires 23 protruding from the corresponding slots 13.

The pair of accommodated portions 21 are formed in an approximately linear shape and are disposed in the corresponding slots 13, which are different from each other, along the axial direction. An insulating sheet (not illustrated) is disposed in each slot 13 to insulate the stator core 10 from each coil 20 (accommodated portion 21). The coil ends 22 are bent to form an approximately triangular shape. The coil ends 22 are disposed to protrude axially outward of the stator core 10 from both the axial end faces 14 of the stator core

10. The pair of coil ends 22 establish connections between ends of the accommodated portions 21 that are circumferentially separate from each other. The lead wires 23 respectively correspond to a first end (winding start) and a second end (winding end) of each rectangular conductor 3 wound multiple times. The lead wires 23 have ends 24 connected by welding to other coils 20, the power line connection terminals 30, or the neutral line connection terminals 40.

As illustrated in FIG. 3, in the first exemplary embodiment, the lead wires 23 radially extend outward in the radial direction (direction R1). The lead wires 23 are disposed at radial positions inward of the outer peripheral face 15 of the stator core 10 as seen in axial view (see FIG. 2). The term "inward of the outer peripheral face 15" involves "on" or "inward" the outer peripheral face 15. More specifically, the lead wires 23 are disposed such that the ends 24 are approximately flush with the outer peripheral face 15 of the stator core 10.

The coils 20 are disposed in the circumferential direction (direction C) in correspondence with the slots 13 in the stator 1. The coils 20 are arranged circumferentially to form an annular ring shape along the inner periphery of the stator core 10 as a whole.

The coils 20 are wound concentrically and mounted to the stator core 10 so as to satisfy the following conditions (A) to (C), for example.

(A) The coils 20 are disposed such that the slots 13, in which the coils 20 are accommodated, are shifted circumferentially one by one. (B) The rectangular conductors of two coils 20 being circumferentially adjacent to each other are mounted so as to alternately overlap each other in a stacking direction (radial direction). (C) Two in-phase coils 20 circumferentially spaced away from each other by a predetermined distance are mounted such that the rectangular conductors of the accommodated portions 21 are alternately aligned in the stacking direction (the radial direction) in the same slot 13.

In cases where the rotating electrical machine 100 is, for example, a three-phase alternating-current (AC) motor, the in-phase coils 20 refer to one of U-phase coils, V-phase coils, and W-phase coils. In this case, the in-phase coils 20 are circumferentially arranged two by two with regard to each of the U-phase coils, the V-phase coils, the and W-phase coils.

Figure 5:
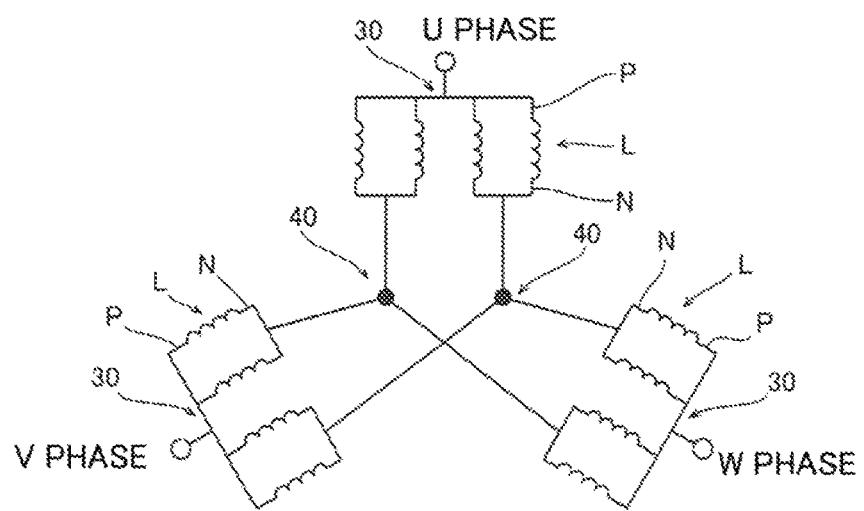
FIG. 5 illustrates an example of a connection method for the coils.

The coils 20 of the respective phases are connected to one another in the form of, for example, a Y connection (a start connection) illustrated in FIG. 5. FIG. 5 illustrates a configuration of four coil rows connected in parallel with regard to each phase. For example, four rows of U-phase coils 20 connected in series (coil rows L) are connected in parallel. In each of the coil rows L, the lead wires 23 of adjacent coils 20 are connected to each other. The lead wire 23 of a coil 20 at one end of each coil row L serves as a power line P connected to an external circuit. The lead wire 23 of a coil 20 at the other end of each coil row L serves as a neutral line N connected to a neutral point. The power line connection terminals 30 establish connections between the power lines P and the external circuits of the respective phase. The neutral line connection terminals 40 serve as neutral points to which the neutral lines N are connected.

As illustrated in FIG. 3, the power line connection terminals 30 and the neutral line connection terminals 40 are respectively connected to the ends 24 of the lead wires 23 of the coils 20. The power line connection terminals 30 are connected to the lead wires 23 serving as the power lines P of the coils 20 of each phase to establish an electrical connection between the external circuit and the coils 20. The neutral line connection terminals 40 are connected to the lead wires 23 serving as the neutral lines N of the coils 20 of each phase to establish an electrical connection between the coils 20. The power line connection terminals 30 and the neutral line connection terminals 40 are each made of a metal with high conductivity, such as copper, and a surface thereof is subjected to insulation treatment except a connecting portion. Examples of the insulation treatment include cladding using a resin coating, accommodation in a casing (not illustrated), and the like.

(Structures of Connection Terminals)

Next, a description will be given of a structure of each power line connection terminal 30 and a structure of each neutral line connection terminal 40.

The first exemplary embodiment employs a plurality of power line connection terminals 30. Specifically, the power line connection terminals 30 are provided in correspondence with the phases of the coil 20. In the three-phase AC motor, at least three power line connection terminals 30 are provided in correspondence with the U phase, the V phase, and the W phase. Moreover, one or more neutral line connection terminals 40 are provided. In the first exemplary embodiment, three power line connection terminals 30 are provided in correspondence with the U phase, the V phase, and the W phase. In the following, the power line connection terminals 30 are independently referred to as the power line connection terminals 30a, 30b, and 30c. Two neutral line connection terminals 40 are provided. The neutral line connection terminals 40 are independently referred to as the neutral line connection terminals 40a and 40b. In the first exemplary embodiment, the power line connection terminals 30 (30a to 30c) and the neutral line connection terminals 40 (40a, 40b) are respectively connected to at least three of the lead wires 23. In other words, the power line connection terminals 30 (30a to 30c) and the neutral line connection terminals 40 (40a, 40b) are respectively connected to the lead wires 23 in at least three places.

Figure 9:
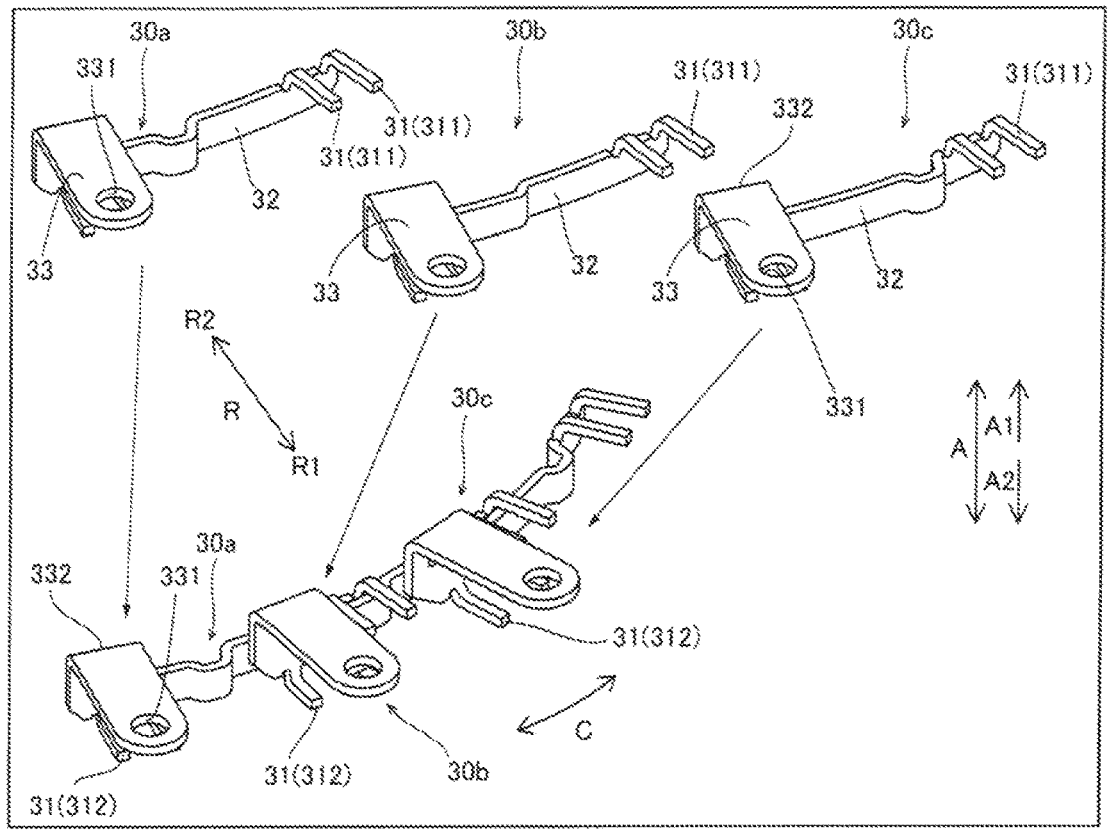
FIG. 9 is a perspective view illustrating three power line connection terminals.

As illustrated in FIG. 9, each of the power line connection terminals 30a to 30c includes multiple (four) lead wire connection portions 31 (i.e., lead wire connector) and a main body 32. The lead wire connection portions 31 have a prism shape in their cross-sections and are closely analogous in shape to the rectangular conductors 3 of the coils 20. The lead wire connection portions 31 are formed to extend from the main body 32. Specifically, the lead wire connection portions 31 extend outward in the radial direction (direction R1) in approximately parallel with the axial end face 14 of the stator core 10. The main body 32 has a plate shape and is wider in width than the lead wire connection portions 31. The main body 32 is disposed such that its thickness direction becomes approximately parallel with the axial end face 14 (i.e., such that the main body 32 becomes approximately perpendicular to the axial end face 14). The main body extends in approximately parallel with the axial end face 14 of the stator core 10 along the circumferential direction (direction C) (see FIGS. 6 and 7).

Each of the three power line connection terminals 30a to 30c includes an external connection terminal portion 33 for connection to an external circuit. Each of the external connection terminal portions 33 has a connection hole 331 for connection to any one of a U-phase external circuit, a V-phase external circuit, and a W-phase external circuit. Each of the external connection terminal portions 33 extends outward in the axial direction (direction A1) from the main body 32, is bent at its bent portion 332, and extends outward in the radial direction (direction R1).

Figure 10:
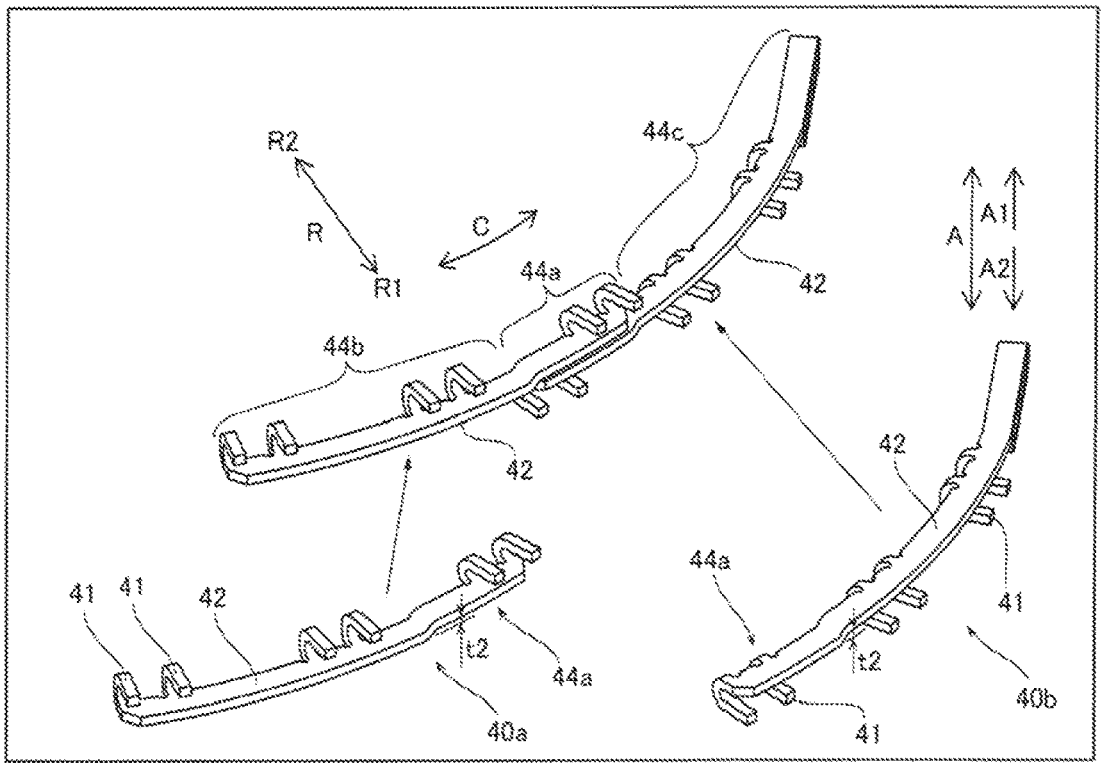
FIG. 10 is an exploded perspective view illustrating two neutral line connection terminals.

As illustrated in FIG. 10, each of the neutral line connection terminals 40a and 40b includes multiple (six) lead wire connection portions 41 and a main body 42. The lead wire connection portions 41 are similar in shape to the lead wire connection portions 31 of each power line connection terminal 30. More specifically, each of the lead wire connection portions 41 extends from the main body 41 in approximately parallel with the axial end face 14 of the stator core 10 and outward in the radial direction (direction R1). The main body 42 has a plate shape, and its thickness direction is directed to the axial direction (i.e., the main body 42 is disposed along the axial end face 14). In other words, the main body 32 of each power me connection terminal 30 and the main body 42 of each neutral line connection terminal 40 cross each other. The main body 42 extends in approximately parallel with the axial end face 14 of the stator core 10 along the circumferential direction (direction C) (see FIGS. 6 and 7).

Each of the power line connection terminals 30 (30a to 30c) includes the four lead wire connection portions 31 to which the lead wires 23 (power lines P) of the in-phase coils 20 are connected, the coils 20 being arranged in four rows connected in parallel (see FIG. 5). The lead wire connection portions 31 of the power line connection terminals 30 are joined to the ends 24 of the lead wires 23 serving as the power lines P. Each of the neutral line connection terminals 40 (40a, 40b) includes the six lead wire connection portions 41 (two for U phase, two for y phase, two for W phase) to which the lead wires 23 (neutral lines N) of the two coils 20 of each phase, the coils 20 being arranged in two rows connected in parallel, from among the three-phase coils 20 respectively arranged in four rows connected in parallel (see FIG. 5). The lead wire connection portions 41 of the neutral line connection terminals 40 are joined to the ends 24 of the lead wires 23 serving as the neutral lines N.

Figure 8:
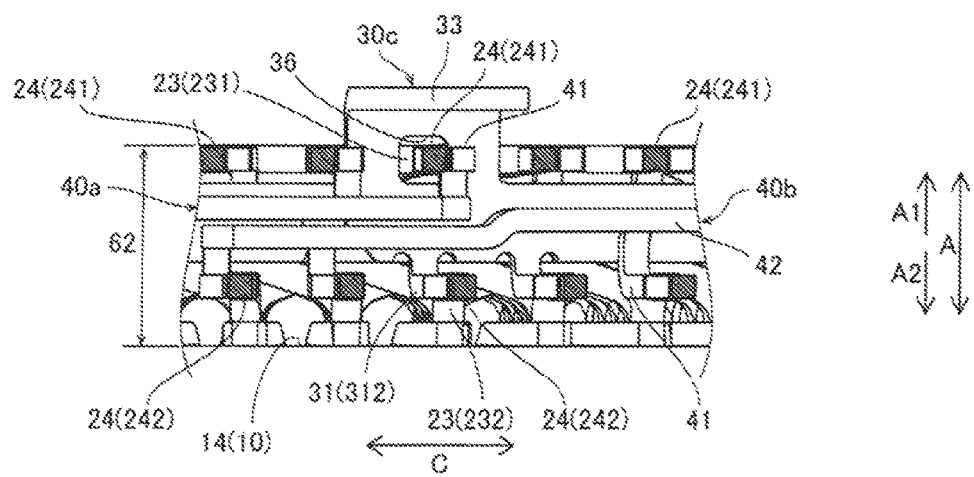
FIG. 8 is an enlarged side view of a peripheral portion of a through-hole in a power line connection terminal.

In the first exemplary embodiment, as illustrated in FIG. 8, the lead wire connection portions (31, 41) of the power line connection terminals 30 and neutral line connection terminals 40 are joined to the ends 24 of the lead wires 23 in the state in which the lead wire connection portions (31, 41) are adjacent to the ends 24 of the lead wires 23 in the circumferential direction of the stator core 10, In other words, the lead wire connection portions 31 (41) and the ends 24 of the lead wires 23 are joined together in the state in which the lead wire connection portions 31 (41) and the ends 24 of the lead wires 23 are juxtaposed to each other in approximately parallel with the axial end face 14 of the stator core 10. The ends 24 of the lead wires 23 are hatched in FIG. 8.

<Positional Relationship between Power Line Connection Terminals and Positional Relationship between Neutral Connection Terminals>

In the first exemplary embodiment, the power line connection terminals 30 and the neutral line connection terminals 40 are juxtaposed to each other in the radial direction (direction R) or axial direction (direction A) of the stator core 10 such that overlap areas are provided where adjacent power line connection terminals 30 or neutral line connection terminals 40 overlap each other in their juxtaposed direction. Moreover, at least one of the overlap areas overlapping each other is offset toward the juxtaposed direction.

Figure 11:
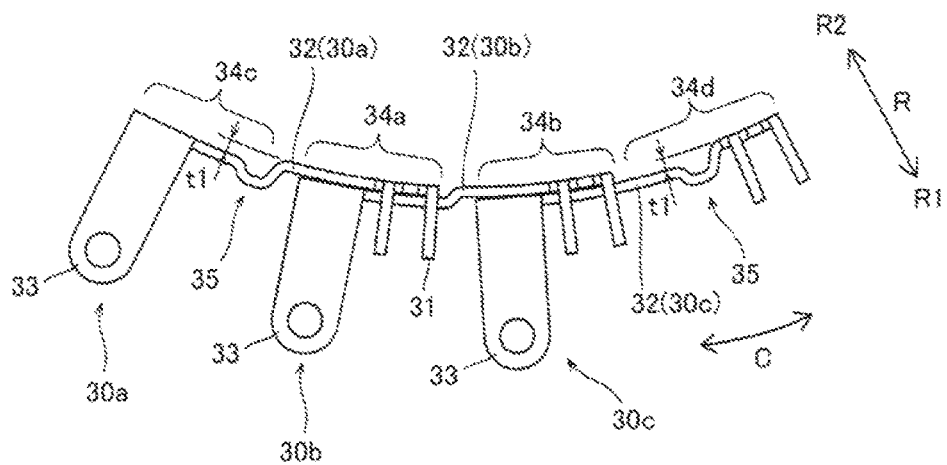
FIG. 11 is a plan view illustrating a positional relationship among the three power line connection terminals.

For example, as illustrated in FIG. 11, the power line connection terminals 30a to 30c are shifted in position approximately uniformly in the circumferential direction (direction C) and are juxtaposed to each other in the radial direction (direction R) of the stator core 10. The power line connection terminals 30a to 30c respectively overlap each other in the radial direction (direction R) in the overlap area 34a and the overlap area 34b.

Specifically, the power line connection terminal 30a and the power line connection terminal 30b overlap each other in the overlap area 34a The power line connection terminal 30b and the power line connection terminal 30c overlap each other in the overlap area 34b. The overlap area 34a and the overlap area 34b are spaced apart from each other in the circumferential direction and do not overlap each other.

In the power line connection terminal 30a, the main body 32 in the overlap area 34a is offset inward in the radial direction (direction R2) by a shift amount t1 with respect to the main body 32 in a non-overlap area 34c. The shift amount t1 corresponds to the thickness of one main body 32. The main body 32 of the power line connection terminal 30b is disposed to overlap outward in the radial direction (direction R1) with respect to the main body 32 in the overlap area 34a, the main body 32 being offset inward in the radial direction.

In the power line connection terminal 30c, the main body 32 in the overlap area 34b is offset outward in the radial direction (direction R1) by the shift amount t1 with respect to the main body 32 in a non-overlap area 34d. The main body 32 of the power line connection terminal 30b is disposed to overlap inward in the radial direction with respect to the main body 32 in the overlap area 34b, the main body 32 being offset outward in the radial direction.

In the power line connection terminal 30b, therefore, the main body 32 in the overlap area 34a and the main body 32 in the overlap area 34b are shifted to each other in the radial direction by the shift amount 11. As a result, in cases where the power line connection terminals 30a to 30c are disposed in a combined manner, a space here the main bodies 32 are disposed in the radial direction (direction R) being their arranged direction is reduced to the thickness of two main bodies 32 as for the three power line connection terminals 30a to 30c.

In each of the power line connection terminals 30a and 30c, a convex bent portion 35 that is formed in the non-overlap area and is bowed radially outward serves as a relief where the lead wire 23 passes. The lead wire 23 axially passes a space radially outward of the convex bent portion 35 (i.e., a recessed space).

As illustrated in FIG. 10, the neutral line connection terminals 40a and 40b are shifted in position in the circumferential direction (direction C) and are juxtaposed to each other in the axial direction (direction A) of the stator core 10. The neutral line connection terminals 40a and 40b overlap each other in the axial direction (direction A) an overlap area 44a.

In the neutral line connection terminal 40a, the main body 42 in the overlap area 44a is offset outward in the axial direction (direction A1) by a shift amount t2 with respect to the main body 42 in a non-overlap area 44b. The shift amount t2 corresponds to about a half of the thickness of the main body 42. In the neutral line connection terminal 40b, the main body 42 in the overlap area 44a is offset inward in the axial direction (direction A2) by the shift amount t2 with respect to the main body 42 in a non-overlap area 44c.

As a result, in cases where the neutral line connection terminals 40a and 40b are disposed in a combined manner, the main bodies 42 of the neutral line connection terminals 40a and 40b in the non-overlap areas (44b, 44c) are approximately flush with each other in the axial direction. Specifically, in the state in which the neutral line connection terminals 40a and 40b are arranged in the axial direction, a space for disposing the main bodies 42 of the neutral line connection terminals 40*a* and 40*b* is equal to a space corresponding to the thickness of one main body 42 excluding the overlap area 44*a* Only the overlap area 44*a* becomes larger from the non-overlap areas (44*b*, 44*c*) toward the axial ends, respectively, by the shift amount t2.

<Positional Relationship between Power Line Connection Terminals and Neutral Line Connection Terminals>

In the first exemplary embodiment, the power line connection terminals 30 and the neutral line connection terminals 40 are juxtaposed to each other in the radial direction of the stator core 10 such that the lead wire connection portions 31 of a power line connection terminal 30 and the main body 42 of a neutral line connection terminal 40 overlap each other as seen from the axial direction of the stator core 10, the power line connection terminal 30 and the neutral line connection terminal 40 being adjacent to each other in the radial direction.

Figure 12:
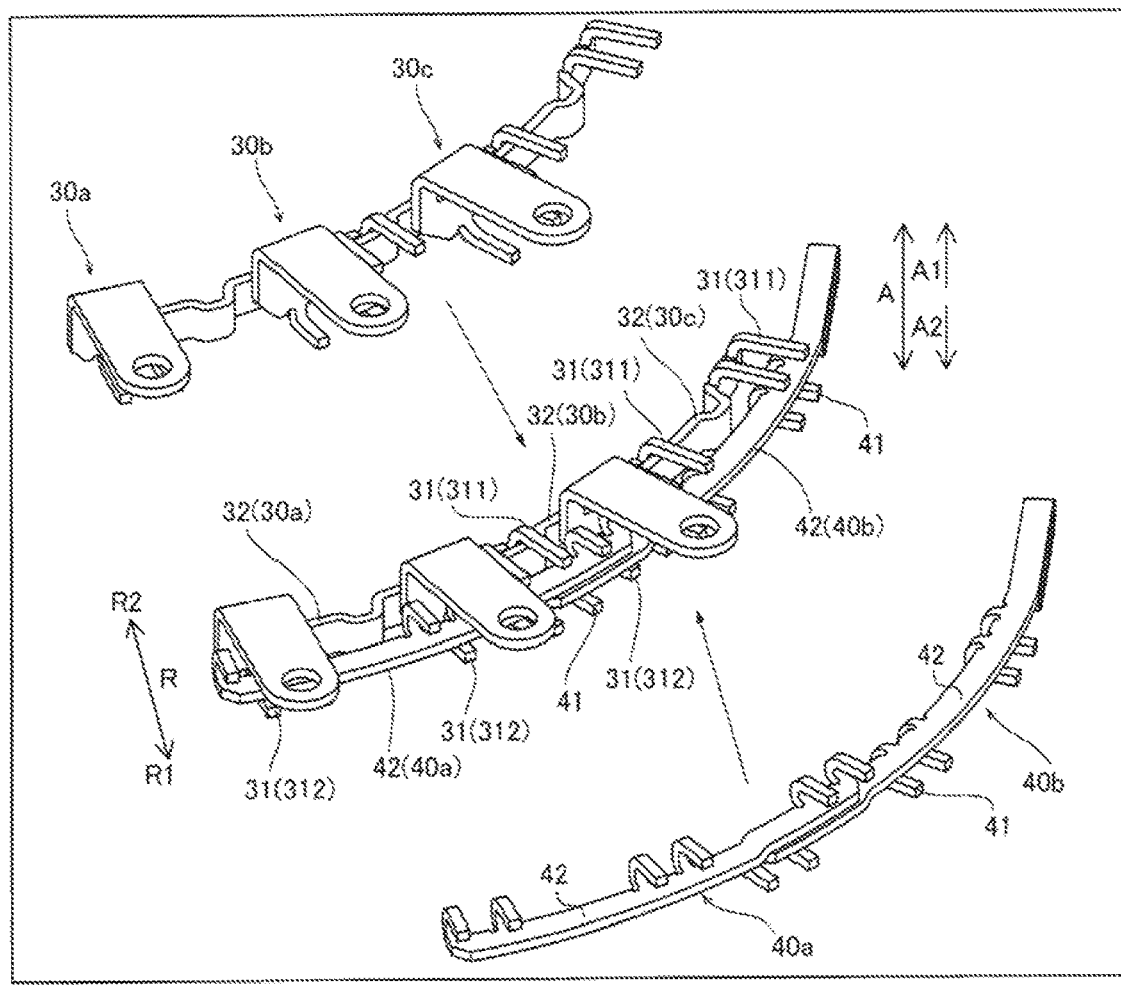
FIG. 12 is a perspective view illustrating a positional relationship between the power line connection terminals and the neutral line connection terminals.
Figure 13:
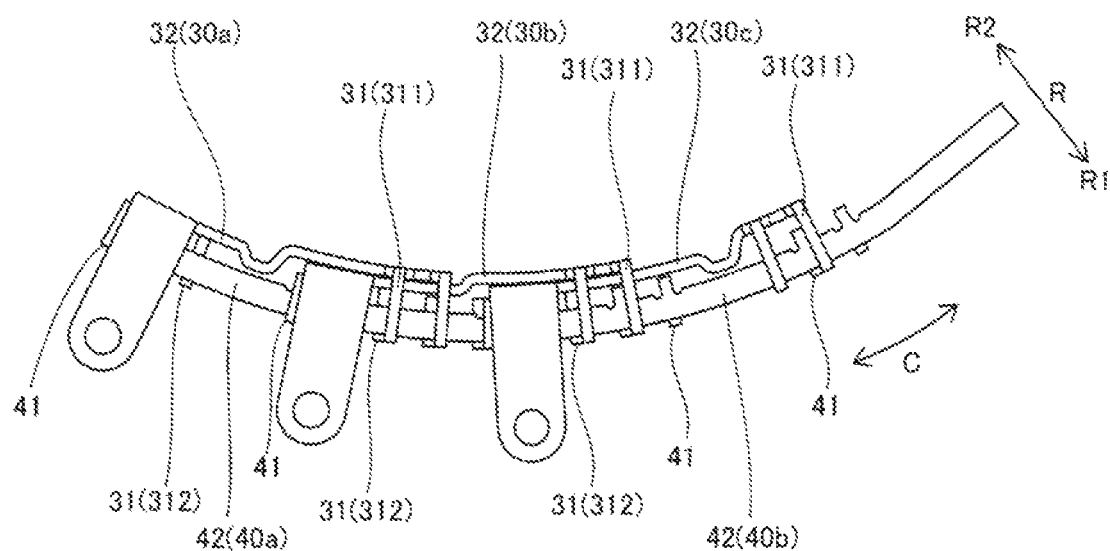
FIG. 13 is a plan view illustrating the positional relationship between the power line connection terminals and the neutral line connection terminals.

Specifically, as illustrated in FIGS. 12 and 13, the power line connection terminals 30*a* to 30*c* and the neutral line connection terminals 40*a* and 40*b* are juxtaposed to each other in the radial direction (direction R) of the stator core 10. The neutral line connection terminals 40*a* and 40*b* are disposed outward in the radial direction (direction R1) of the stator core 10 with respect to the power line connection terminals 30*a* to 30*c*. The neutral line connection terminals 40*a* and 40*b* are disposed to be adjacent to the power line connection terminals 30*a* to 30*c* in the radial direction.

As illustrated in FIG. 12, the lead wire connection portions 31 of the power line connection terminals 30*a* to 30*c* each include a first connection portion 311 disposed on the axially outer side (direction A1 side), and a second connection portion 312 disposed on the axially inner side (direction A2 side). The main bodies 42 of the neutral line connection terminals 40*a* and 40*b* are disposed between the first connection portions 311 and the second connection portions 312 in the power line connection terminals 30*a* to 30*c*. As illustrated in FIG. 13, thus, the lead wire connection portions 31 of the power line connection terminals 30 and the main bodies 42 of the neutral line connection terminals 40 overlap each other as seen from the axial direction of the stator core 10.

In the first exemplary embodiment, as illustrated in FIG. 12, the main bodies 42 of the neutral line connection terminals 40*a* and 40*b* are disposed in approximately parallel with the axial end face 14 of the stator core 10 with respect to the power line connection terminals 30*a* to 30*c* disposed such that the main bodies 32 having a flat plate shape are provided upright with respect to the axial end face 14. The main bodies 42 of the neutral line connection terminals 40*a* and 40*b* are thus accommodated in an axial space formed between the first connection portions 311 and the second connection portions 312 in the power line connection terminals 30*a* to 30*c*.

In the first exemplary embodiment, of the power line connection terminal 30 and the neutral line connection terminal 40, the power line connection terminals 30*a* to 30*c* disposed on the radially inner side have through-holes 36 (see FIG. 8) through which the lead wires 23 pass, the lead wires 23 being connected to the neutral line connection terminals 40*a* and 40*b* disposed on the radially outer side.

Figure 7:
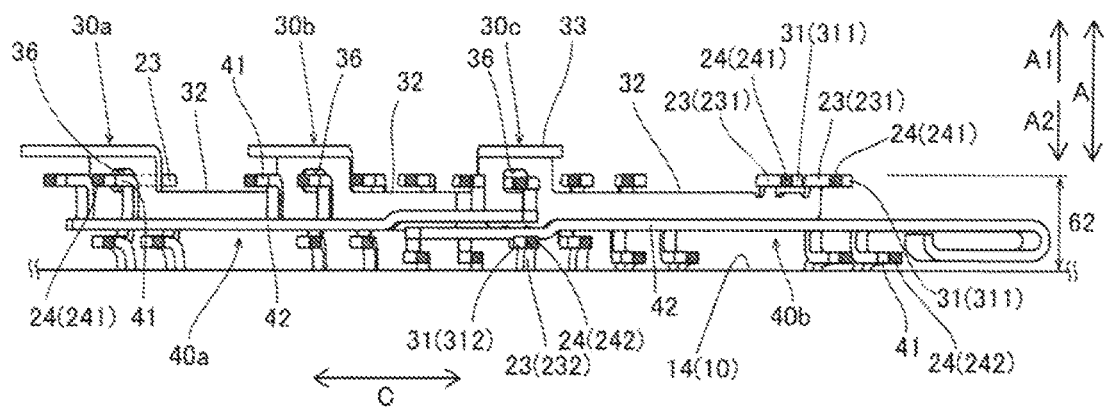
FIG. 7 is a schematic enlarged side view illustrating the positional relationship between the stator core and each of the power line connection terminals and the neutral line connection terminals.

As illustrated in FIG. 7, the through-holes 36 are formed in the root portions of the external connection terminal portions 33 of the power line connection terminals 30*a* to 30*c*. Each of the through-holes 36 has an inner peripheral face subjected to insulation treatment such as a resin coating. The through-holes 36 are larger in size than the lead wires 23 (rectangular conductors 3) having the rectangular shape in their cross-sections. In FIGS. 7 and 8, the through-holes 36 have a rectangular shape corresponding to the rectangular shape of the lead wires 23 in their cross-sections. The ends 24 of the lead wires 23 are hatched in FIG. 7.

The lead wires 23 pass through the through-holes 36 and are joined to the lead wire connection portions 41 of the neutral line connection terminals 40. The neutral line connection terminals 40 and the lead wires 23 are thus connected to each other without making the lead wires 23 passing by the external connection terminal portions 33 largely different in shape from the other lead wires 23. Moreover, the neutral line connection terminals 40*a* and 40*b* and the power line connection terminals 30*a* to 30*c* are coupled to each other with a slight play between the lead wires 23 and the through-holes 36.

<Positional Relationship Between Stator and Each of Power Line Connection Terminals and Neutral Line Connection Terminals>

Figure 6:
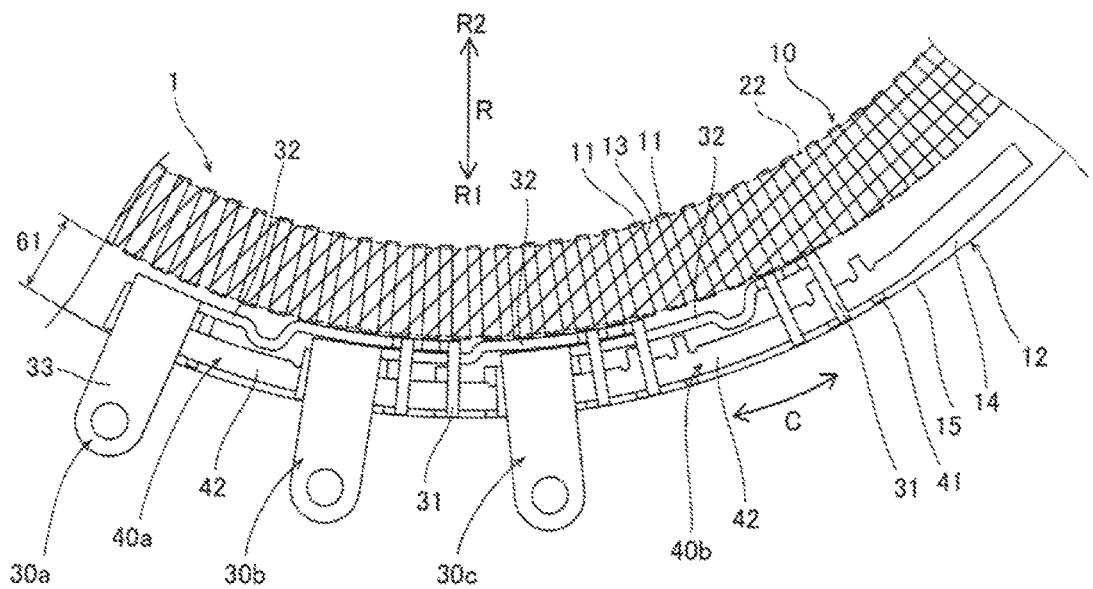
FIG. 6 is a schematic enlarged plan view illustrating a positional relationship between a stator core and each of the power line connection terminals and the neutral line connection terminals.

As illustrated in FIG. 6, the power line connection terminals 30 and the neutral line connection terminals 40 are formed to extend in an arc shape along the circumferential direction of the stator 1. Moreover, the power line connection terminals 30 and the neutral line connection terminals 40 are disposed to overlap the ends 24 of the lead wires 23 as seen from the axial direction (see FIG. 3).

In the first exemplary embodiment, both the power line connection terminals 30 and the neutral line connection terminals 40 are disposed between the coil ends 22 and the outer peripheral face 15 of the stator core 10 in the radial direction (direction R) of the stator core 10 and between the axial end face 14 of the stator core 10 and the ends 24 of the lead wires 23 in the axial direction (direction A) of the stator core 10.

Specifically, the power line connection terminals 30 and the neutral line connection terminals 40 are placed within a radial range 61 between the radially outer ends of the coil ends 22 (hatched portions) and the outer peripheral face 15 of the stator core 10 in the radial direction (direction R) of the stator core 10. In other words, the radial range 61 corresponds to the back yoke 12 between the radially outer ends of the slots 13 (the root-side ends of the teeth 11) and the outer peripheral face 15 of the stator core 10.

As illustrated in FIGS. 7 and 8, the power line connection terminals 30 and the neutral line connection terminals 40 are also placed within an axial range 62 between the axial end face 14 of the stator core 10 and the ends 24 of the lead wires 23 in the axial direction of the stator core 10. In the first exemplary embodiment, as described above, the power line connection terminals 30 and the neutral line connection terminals 40 are provided to be in place on the back yoke 12. The description is given of the power line connection terminals 30 excluding the external connection terminal portions 33.

In the first exemplary embodiment, the main bodies 32 (42) of the power line connection terminals 30 and neutral line connection terminals 40 are disposed to be in place between the coil ends 22 and the outer peripheral face 15 of the stator core 10 in the radial direction and between the axial end face 14 of the stator core 10 and the ends 24 of the lead wires 23 in the axial direction.

As seen from the radial direction, each of the main bodies 32 of the power line connection terminals 30 (30*a* to 30*c*) and each of the main bodies 42 of the neutral line connection terminals 40 (40*a* and 40*b*) are placed within the radial range 61 as illustrated in FIG. 6. The respective main bodies 32 and 42 entirely fall within the radial range 61 without deviating from the radial range 61.

As seen from the axial direction, each of the main bodies 32 of the power line connection terminals 30 and each of the main bodies 42 of the neutral line connection terminals 40 are placed within the axial range 62 as illustrated in FIG. 7. The respective main bodies 32 and 42 entirely fall within the axial range 62 without deviating from the axial range 62.

The lead wires 23 include first lead wires 231 having ends 241 disposed outward in the axial direction, and second lead wires 232 having ends 242 disposed inward in the axial direction with respect to the ends 241 of the first lead wires 231. In the first exemplary embodiment, the power line connection terminals 30 and the neutral line connection terminals 40 are disposed between the ends 241 of the first lead wires 231 and the ends 242 of the second lead wires 232 in the axial direction of the stator core 10.

In the power line connection terminals 30, specifically, the first connection portions 311 on the axially upper side (A1 side) with respect to the main bodies 32 are joined to the ends 241 of the first lead wires 231. Moreover, the second connection portions 312 on the axially lower side (A2 side) with respect to the main bodies 32 are joined to the ends 242 of the second lead wires 232. As a result, the respective main bodies 32 are disposed between the ends 241 of the first lead wires 231 and the ends 242 of the second lead wires 232.

The similar things may hold true for the neutral line connection terminals 40. The lead wire connection portions 41 on the axially upper side (A1 side) with respect to the main bodies 42 are joined to the ends 241 of the first lead wires 231. Moreover, the lead wire connection portions 41 on the axially lower side (A2 side) with respect to the main bodies 42 are joined to the ends 242 of the second lead wires 232. As a result, the respective main bodies 42 are disposed between the ends 241 of the first lead wires 231 and the end 242 of the second lead wires 232.

Advantageous Effects of First Exemplary Embodiment

The first exemplary embodiment can produce the following advantageous effects.

In the first exemplary embodiment, as described above, the power line connection terminal 30 and the neutral line connection terminal 40 are connected to at least three of the lead wires 23 in the state in which the power line connection terminal 30 and the neutral line connection terminal 40 are adjacent to the ends 24 of the lead wires 23 in the circumferential direction (direction C) of the stator core 10. It is thus possible to connect multiple (at least three) lead wires 23 to one another via one connection member (power line connection terminal 30 or neutral line connection terminal 40). It is therefore possible to establish a connection among the lead wires 23 without increasing the number of connection members (power line connection terminals 30 and neutral line connection terminals 40) even when the number of connection points is large as described in the first exemplary embodiment in which four coils 20 of each phase are connected in parallel. Moreover, since the connection members (power line connection terminal 30 and neutral line connection terminal 40) are connected to the lead wires 23 in the state in which the connection members are adjacent to the ends 24 of the lead wires 23 in the circumferential direction of the stator core 10, it is possible to suppress an increase in size (thickness) of the joint between the ends 24 of the lead wires 23 and the connection members (power line connection terminal 30 and neutral line connection terminal 40) in the axial direction (direction A) of the stator core 10. It is also possible to enlarge the axial space (axial range 62) between the axial end face 14 of the stator core 10 and the ends 24 of the lead wires 23. It is therefore possible to easily dispose the connection members (power line connection terminal 30 and neutral line connection terminal 40) on the region between the coil ends 22 and the outer peripheral face 15 of the stator core 10 in the radial direction of the stator core 10 and between the axial end face 14 of the stator core 10 and the ends 24 of the lead wires 23 in the axial direction of the stator core 10. As a result, it is possible to suppress protrusion of the connection members (power line connection terminal 30 and neutral line connection terminal 40) axially outward of the stator 1 and to suppress protrusion of the connection members (power line connection terminal 30 and neutral line connection terminal 40) radially outward of the stator 1, which makes it possible to suppress an increase in size of the stator 1.

With the stator 1 according to the first exemplary embodiment, hence, it is possible to suppress an increase in size of the stator 1 and to suppress an increase in number of parts even when the number of connection points via the connection members (power line connection terminals 30 and neutral line connection terminals 40) increases. For example, in cases where the ends of the lead wires are extended to the radially outer side of the stator, the long lead wires are susceptible to vibrations depending on service conditions. In contrast to this, according to the first exemplary embodiment, it is unnecessary to elongate the ends 24 of the lead wires 23 to the radially outer side of the stator 1. It is therefore possible to improve resistance to vibrations even under service conditions being prone to vibrations, for example, in cases where the rotating electrical machine 100 (stator 1) is mounted on a movable object such as a vehicle.

Also in the first exemplary embodiment, as described above, the main bodies 32 (42) of the power line connection terminals 30 and neutral line connection terminals 40 are disposed to be in place between the coil ends 22 and the outer peripheral face 15 of the stator core 10 in the radial direction and between the axial end face 14 of the stator core 10 and the ends 24 of the lead wires 23 in the axial direction. It is thus possible to put at least the main bodies 32 (42) of the power line connection terminals 30 and neutral line connection terminals 40 within the predetermined range on the stator core 10 without deviating the main bodies 32 (42) from the predetermined range. As a result, it is possible to further reduce local protrusions from the stator 1.

Also in the first exemplary embodiment, as described above, the lead wire connection portions 31 (41) and the ends 24 of the lead wires 23 are joined together in the state in which the lead wire connection portions 31 (41) and the ends 24 of the lead wires 23 are adjacent to each other in the circumferential direction of the stator core 10. It is thus possible to reduce an axial dimension of the joint as compared with cases where the lead wire connection portions 31 (41) and the ends 24 of the lead wires 23 are joined together in a state in which the lead wire connection portions 31 (41) and the ends 24 of the lead wires 23 overlap each other in the axial direction (direction A), for example. Moreover, the respective lead wires 23 are provided to radially extend toward the radial direction. It is therefore possible to secure a satisfactory circumferential clearance between the ends 24 at the radially outer position where the ends 24 are disposed. As a result, it is possible to easily join the lead wire connection portions 31 (41) and the ends 24 of the lead wires 23 together.

Also in the first exemplary embodiment, as described above, the power line connection terminals 30 and the neutral line connection terminals 40 are disposed between the ends 241 of the first lead wires 231 and the ends 242 of the second lead wires 232 in the axial direction (direction A) of the stator core 10. It is thus possible to dispose the power line connection terminals 30 and the neutral line connection terminals 40 on a space formed between the lead wires 23 (231, 232). As a result, it is possible to more effectively reduce local protrusions from the stator 1.

Also in the first exemplary embodiment, as described above, the neutral line connection terminals 40 are disposed on the radially outer side (direction R1 side) of the stator core 10 with respect to the power line connection terminals 30, With this configuration, in assembling the stator 1, the power line connection terminals 30 on the radially inner side (direction R2 side) are connected to the lead wires 23, but the neutral line connection terminals 40 on the radially outer side are not connected to the lead wires 23. As a result, the coils 20 can be subjected to an inter-phase insulation test and an intra-phase insulation test without connections to a neutral line N and, after the insulation tests, the neutral line connection terminal 40 can be easily mounted to the stator 1. Accordingly, as described above, it is possible to avoid degradation in workability in assembling the stator 1 while reducing local protrusions from the stator 1, by disposing the power line connection terminals 30 and the neutral line connection terminals 40 in the space on the axial end face 14 of the stator core 10.

Also in the first exemplary embodiment, as described above, the power line connection terminals 30 and the neutral line connection terminals 40 are juxtaposed to each other in the radial direction of the stator core 10. Of the power line connection terminals 30 and the neutral line connection terminals 40, ones (power line connection terminals 30) disposed on the radially inner side have the through-holes 36 through which the lead wires 23 pass, the lead wires 23 being connected to the others (neutral line connection terminals 40) disposed on the radially outer side. It is thus possible to connect the lead wires 23 to the neutral line connection terminals 40 without elongating the lead wires 23 even when the power line connection terminals 30 and the neutral line connection terminals 40 are juxtaposed to each other in the radial direction. It is also possible to indirectly couple the power line connection terminals 30 and the neutral line connection terminals 40 together via the through-holes 36 and the lead wires 23 in the through-holes 36. As a result, it is possible to improve the resistance to vibrations of the neutral line connection terminals 40 disposed on the radially outer side, by the coupling between the power line connection terminals 30 and the neutral line connection terminals 40 even when the rotating electrical machine 100 (stator 1) vibrates in a movable object such as a vehicle, for example.

Also in the first exemplary embodiment, as described above, the power line connection terminals 30 and the neutral line connection terminals 40 are juxtaposed to each other in the radial direction or axial direction of the stator core 10 such that overlap areas (34a, 34b, 44a) are provided where adjacent power line connection terminals 30 or neutral line connection terminals 40 overlap each other in their juxtaposed direction. At least one of the overlap areas (34a, 34b, 44a) overlapping each other is offset toward the juxtaposed direction. It is thus possible to lessen a space where the power line connection terminals 30 are placed. For example, as illustrated in FIG. 11, in the overlap area 34a of the power line connection terminals 30a and 30b and the overlap area 34b of the power line connection terminals 30b and 30c, three power line connection terminals 30 (30a to 30c) can be placed in a space corresponding to substantially two power line connection terminals (two main bodies).

Also in the first exemplary embodiment, as described above, the lead wire connection portions 31 of the power line connection terminal 30 and the main body 42 of the neutral line connection terminal 40 overlap each other as seen from the axial direction of the stator core 10, the power line connection terminal 30 and the neutral line connection terminal 40 being adjacent to each other in the radial direction. It is thus possible to dispose the power line connection terminal 30 and the neutral line connection terminal 40 in proximity to each other such that the power line connection terminal 30 and the neutral line connection terminal 40 partially overlap each other. As a result, it is possible to further lessen a space where the power line connection terminals 30 and the neutral line connection terminals 40 are placed. It is therefore possible to more effectively reduce local protrusions from the stator 1.

Also in the first exemplary embodiment, as described above, each of the connection members (power line connection terminal 30 and neutral line connection terminal 40) includes the main body (32, 42) having the plate shape and extending in approximately parallel with the axial end face 14 of the stator core 10, and the at least three lead wire connection portions (31, 41) formed to extend from the main body (32, 42) and joined to the ends 24 of the lead wires 23 in the state in which the lead wire connection portions (31, 41) are adjacent to the ends 24 of the lead wires 23 in the circumferential direction (direction C). It is thus possible to ensure a large current passing cross-sectional area corresponding to the number of coils to be connected, by virtue of the plate-shaped main body (32, 42) and to dispose the main body (32, 42) between the ends 24 of the lead wires 23 and the axial end face 14 of the stator core 10. Also in this case, it is possible to easily connect (weld) the lead wire connection portions (31, 41) formed to extend from the main bodies (32, 42), to the corresponding lead wires 23.

Second Exemplary Embodiment

Figure 14:
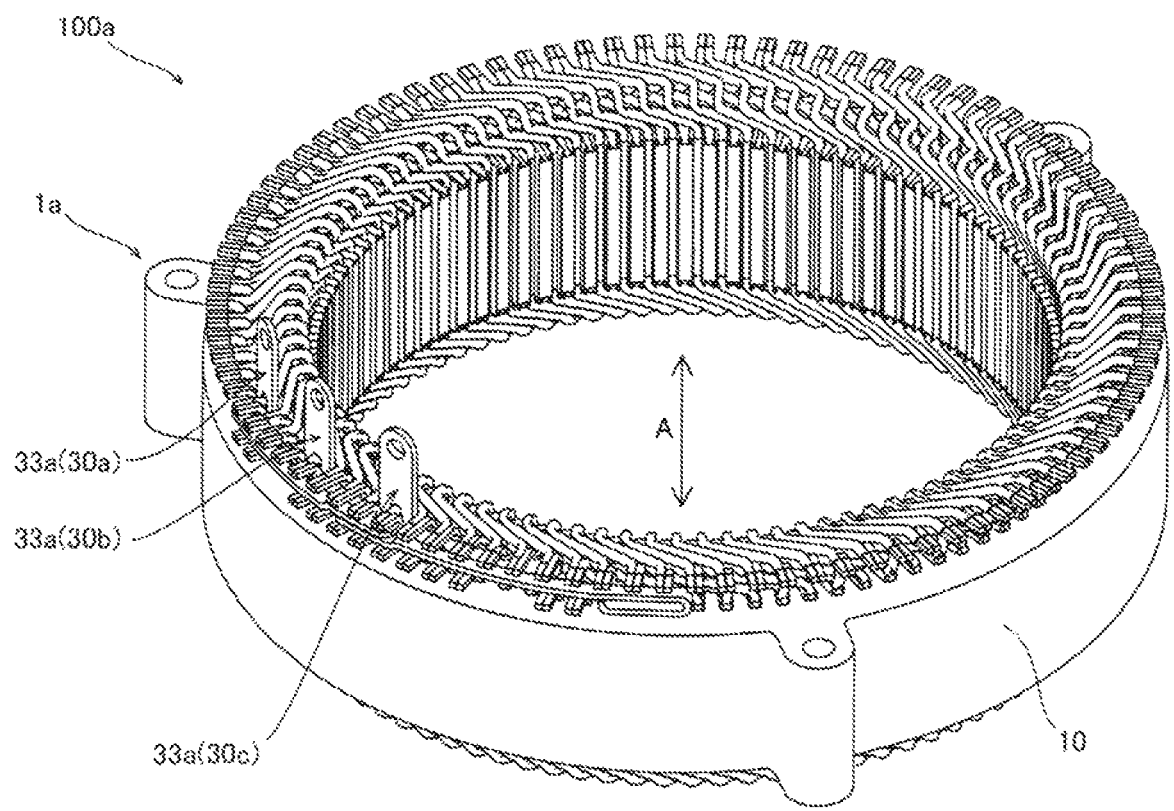
FIG. 14 is a perspective view of a rotating electrical machine according to a second exemplary embodiment.

With reference to FIG. 14, next, a description will be given of a second exemplary embodiment of the present disclosure. The second exemplary embodiment is different from the first exemplary embodiment in which the external connection terminal portions 33 of the power line connection terminals 30 are formed to extend outward in the radial direction (direction R1). In the second exemplary embodiment, the external connection terminal portions 33 are formed to extend in the axial direction (direction A).

In a stator 1a of a rotating electrical machine 100a according to the second exemplary embodiment, as illustrated in FIG. 14, external connection terminal portions 33a of power line connection terminals 30a to 30c are formed to extend in the axial direction (direction A) of a stator core 10.

The external connection terminal portions 33a in the second exemplary embodiment are different from the external connection terminal portions 33 (see FIG. 3) formed to be bent at the bent portions 332 toward the radial direction. Specifically, the external connection terminal portions 33a are not provided with the bent portions 332 (see FIG. 9), but extend linearly in the axial direction.

Other configurations in the second exemplary embodiment are similar to those in the first exemplary embodiment.

Advantageous Effects of Second Exemplary Embodiment

Also in the second exemplary embodiment, similarly to the first exemplary embodiment, it is possible to reduce local protrusions from the stator 1a owing to the joint between each of the power line connection terminal 30 and the neutral line connection terminal 40 and the lead wires 23. In the rotating electrical machine 100a (stator 1a) according to the second exemplary embodiment, the external connection terminal portions 33a protrude in the axial direction. However, the shape, position, orientation, and the like of each external connection terminal portion 33a are set in accordance with a structure of a device on which the rotating electrical machine 100a is mounted, Therefore, the protrusions owing to the external connection terminal portions 33a present no problem. In the rotating electrical machine 100a (stator 1a) according to the second exemplary embodiment, portions, excluding the external connection terminal portions 33a, of the power line connection terminals 30a to 30c are in place between the stator core 10 and ends 24 of the lead wires 23. Similarly to the first exemplary embodiment, therefore, it is possible to suppress restrictions on the rotating electrical machine 100a (stator 1a) in mounting the rotating electrical machine 100a (stator 1a) on a device. It is also possible to reduce the outer dimensions of the rotating electrical machine 100a (stator 1a).

Other advantageous effects of the second exemplary embodiment are similar to those of the first exemplary embodiment.

[Modifications]

It is to be understood that the embodiments disclosed herein are merely illustrative and not restrictive in all respects.

For example, the first exemplary embodiment shows the five connection terminals, that is, the three power line connection terminals 30a to 30c and the two neutral line connection terminals 40a and 40b; however, the present disclosure is not limited thereto. The present disclosure may employ any number of power line connection terminals 30 and any number of neutral line connection terminals 40.

The first exemplary embodiment also shows that the main bodies (32, 42) of the power line connection terminal 30 and neutral line connection terminal 40 fall within the radial range 61 and the axial range 62; however, the present disclosure is not limited thereto. The present disclosure may employ a configuration in which the main bodies partly deviate from the foregoing ranges.

The first exemplary embodiment also shows that the lead wire connection portions 31 (41) of the power line connection terminal 30 and neutral line connection terminal 40 are joined to the ends 24 of the lead wires 23 in the state in which the lead wire connection portions 31 (41) are adjacent to the ends 24 of the lead wires 23 in the circumferential direction (direction C) of the stator core 10; however, the present disclosure is not limited thereto. The present disclosure may employ a configuration in which the lead wire connection portions are adjacent to the ends of the lead wires in the axial direction of the stator core.

The first exemplary embodiment also shows that the power line connection terminal 30 and the neutral line connection terminal 40 are disposed between the end 241 of the first lead wire 231 and the end 242 of the second lead wire 232; however, the present disclosure is not limited thereto. The present disclosure may employ a configuration in which the power line connection terminal 30 and the neutral line connection terminal 40 are not disposed between the end of the first lead wire and the end of the second lead wire. For example, the power line connection terminal 30 and the neutral line connection terminal 40 may be disposed to be close to the axial end face 14 of the stator core 10 (direction Z2 side) with respect to the end 242 of the second lead wire 232. That is, the power line connection terminal 30 and the neutral line connection terminal 40 may be disposed between the ends of the first and second lead wires and the axial end face of the stator core.

The first exemplary embodiment also shows the power line connection terminals 30 and the neutral line connection terminals 40; however, the present disclosure is not limited thereto. For example, the present disclosure does not necessarily employ a neutral line connection terminal in cases where a connection having no neutral point, such as a delta connection, is established among coils of each phase in a stator.

The first exemplary embodiment also shows that the neutral line connection terminal 40 is disposed on the radially outer side (direction R1 side) with respect to the power line connection terminal 30; however, the present disclosure is not limited thereto. The present disclosure may employ a configuration in which the neutral line connection terminal is disposed on the radially inner side (direction R2 side) with respect to the power line connection terminal.

The first exemplary embodiment also shows that the power line connection terminal 30 has the through-hole 36 through which the lead wire 23 passes; however, the present disclosure is not limited thereto. The present disclosure does not necessarily employ a through-hole. In this case, the lead wire may be formed to bypass the power line connection terminal. In cases where the neutral line connection terminal is disposed on the radially inner side (direction R2 side) with respect to the power line connection terminal, the neutral line connection terminal may have a through-hole.

The first exemplary embodiment shows that the lead wire connection portion 31 of the power line connection terminal 30 and the main body 42 of the neutral line connection terminal 40 overlap each other in the axial direction; however, the present disclosure is not limited thereto. The present disclosure may employ a configuration in which the power line connection terminal and the neutral line connection terminal are disposed so as not to overlap each other in the axial direction.

The first exemplary embodiment also shows that the overlap areas (34a, 34b, 44a) where the power line connection terminals 30 overlap each other are offset in the juxtaposed direction; however, the present disclosure is not limited thereto. The present disclosure may employ a configuration in which the overlap areas are not offset. For example, in cases where the back yoke 12 of the stator core 10 has relatively larger radial dimensions (i.e., in cases where the radial range 61 is relatively larger), it is possible to satisfactorily reduce local protrusions from the stator even when the power line connection terminals or neutral line connection terminals are arranged in the radial direction without being offset.

The first and second exemplary embodiments show the arrangement and structure of the power line connection terminals 30; however, the shape of the external connection terminal portion 33 (33a) is not particularly limited. This is because the shape of the external connection terminal portion 33 (33a) is set in accordance with a structure of a device on which the rotating electrical machine 100 is mounted. Accordingly, the external connection terminal portion 33 (33a) may be formed to extend in the radial direction without being provided with the bent portion 332. Alternatively, the external connection terminal portion 33 (33a) may be formed to extend like a cable and may be led to a portion to be connected to a device on which the rotating electrical machine is mounted.

The first and second exemplary embodiments also show that the coil 20 is formed of the rectangular conductor 3 having the rectangular shape in its cross-section; however, the present disclosure is not limited thereto. The present disclosure may employ a configuration in which the coil is formed of a conductor having a polygonal shape, in addition to the rectangular shape, or a circular shape in its cross-section. Alternatively, the conductor may be a bundle of multiple thin conductors, and the coil may be formed of the bundle that is wound.

The first and second exemplary embodiments also show that the connection member (power line connection terminal 30, neutral line connection terminal 40) includes the lead wire connection portion (31, 41) and the main body (32, 42); however, the present disclosure is not limited thereto. For example, the end 24 of the lead wire 23 may be directly connected to the main body without the lead wire connection portion. Moreover, the lead wire connection portion (31, 41) is not necessarily similar in shape to the lead wire 23, but may have a block shape or a plate shape. The main body (32, 42) may have, for example, a prism shape in addition to the flat plate shape.

The first and second exemplary embodiments also show that the power line connection terminal 30 and the neutral line connection terminal 40 respectively have the four lead wire connection portions 31 and the six lead wire connection portions 41; however, the present disclosure is not limited thereto. The present disclosure may employ any number of lead wire connection portions. The number of lead wire connection portions is preferably the same as the number (at least three) of lead wires 23 to be connected to the connection member from the viewpoint of ease of connection. However, multiple lead wires 23 may be connected to one lead wire connection portion, for example. In this case, the number of lead wire connection portions may be smaller than the number of lead wires 23 to be connected to the lead wire connection portion.

The invention claimed is:

1. A stator comprising:
   a stator core including a plurality of teeth with a slot in between;
   at least three coils each formed of a conductor, each of the coils including:
      an accommodated portion accommodated in the corresponding slot,
      a coil end disposed on an outer side of an end face of the stator core, and
      a lead wire protruding from the accommodated portion and extending radially outward of the stator core; and
   a connector connected to ends of the lead wires of the at least three coils, wherein:
      the connector is disposed between the coil ends and an outer peripheral face of the stator core in a radial direction of the stator core and between an axial end face of the stator core and the ends of the lead wires in an axial direction of the stator core,
      the connector is connected to at least three of the lead wires in a state in which the connector is adjacent to the ends of the lead wires in a circumferential direction of the stator core,
      the lead wires include:
         a first lead wire having an end disposed outward in the axial direction, and
         a second lead wire having an end disposed inward in the axial direction with respect to the end of the first lead wire, and
      the connector is disposed between the end of the first lead wire and the end of the second lead wire in the axial direction of the stator core.

2. The stator according to claim 1, wherein
   the connector includes:
      a plurality of lead wire connectors joined to the ends of the lead wires in a state in which the lead wire connectors are adjacent to the ends of the lead wires in the circumferential direction, and
      a main body connecting the lead wire connectors to one another, and
   the main body is disposed to be in place between the coil ends and the outer peripheral face of the stator core in the radial direction and between the axial end face of the stator core and the ends of the lead wires in the axial direction.

3. The stator according to claim 2, wherein
   the connector includes:
      a power line connector connected to a lead wire serving as a power line, and
      a neutral line connector connected to a lead wire serving as a neutral line, and
   the neutral line connector is disposed on a radially outer side of the stator core with respect to the power line connector.

4. The stator according to claim 2, wherein
   the connector includes:
      a power line connector connected to a lead wire serving as a power line, and
      a neutral line connector connected to a lead wire serving as a neutral line,
   the power line connector and the neutral line connector are juxtaposed to each other in the radial direction of the stator core, and
   one of the power line connector and the neutral line connector, which is disposed radially inward of the stator core, has a through-hole through which a lead wire passes, the lead wire being connected to the other connector disposed radially outward of the stator core.

5. The stator according to claim 2, wherein
   the connector comprises a plurality of connectors juxtaposed to one another in the radial direction or axial direction of the stator core such that overlap areas are provided where adjacent connectors overlap each other in their juxtaposed direction, and
   at least one of the overlap areas overlapping each other is offset toward the juxtaposed direction.

6. The stator according to claim 1, wherein
   the connector includes:
      a power line connector connected to a lead wire serving as a power line, and
      a neutral line connector connected to a lead wire serving as a neutral line, and
   the neutral line connector is disposed on a radially outer side of the stator core with respect to the power line connector.

7. The stator according to claim 1, wherein
   the connector includes:
      a power line connector connected to a lead wire serving as a power line, and
      a neutral line connector connected to a lead wire serving as a neutral line,
   the power line connector and the neutral line connector are juxtaposed to each other in the radial direction of the stator core, and
   one of the power line connector and the neutral line connector, which is disposed radially inward of the stator core, has a through-hole through which a lead wire passes, the lead wire being connected to the other connector disposed radially outward of the stator core.

8. The stator according to claim 1, wherein
the connector comprises a plurality of connectors juxtaposed to one another in the radial direction or axial direction of the stator core such that overlap areas are provided where adjacent connectors overlap each other in their juxtaposed direction, and
at least one of the overlap areas overlapping each other is offset toward the juxtaposed direction.

9. The stator according to claim 1, wherein
the connector comprises a plurality of connectors each including
   a plurality of lead wire connectors joined to the ends of the lead wires in a state in which the lead wire connectors are adjacent to the ends of the lead wires in the circumferential direction, and
   a main body connecting the lead wire connectors to one another,
the connectors being juxtaposed to one another in the radial direction of the stator core, and
the lead wire connectors of one of the connectors being adjacent to each other in the radial direction and the main body of the other connector overlap each other as seen from the axial direction of the stator core.

10. The stator according to claim 1, wherein
the connector includes
   a main body having a plate shape and extending in approximately parallel with the axial end face of the stator core, and
   at least three lead wire connectors formed to extend from the main body and joined to the ends of the lead wires in a state in which the lead wire connectors are adjacent to the ends of the lead wires in the circumferential direction.

11. A stator comprising:
a stator core including a plurality of teeth with a slot in between;
at least three coils each including:
   an accommodated portion accommodated in the corresponding slot,
   a coil end disposed on an outer side of an end face of the stator core, and
   a lead wire protruding from the accommodated portion and extending radially outward of the stator core; and
a connector connected to ends of the lead wires of the at least three coils, wherein:
   the connector is disposed between an axial end face of the stator core and the ends of the lead wires in an axial direction of the stator core,
   the connector extends along a circumferential direction of the stator core, and
   the connector is connected to the lead wires in at least three distinct locations along the connector,
   the lead wires include:
      a first lead wire having an end disposed outward in the axial direction, and
      a second lead wire having an end disposed inward in the axial direction with respect to the end of the first lead wire, and
   the connector is disposed between the end of the first lead wire and the end of the second lead wire in the axial direction of the stator core.

* * * * *